United States Patent [19]
Van Osch

[11] 3,868,710
[45] Feb. 25, 1975

[54] STILL CAMERA FILM METERING MECHANISM

[76] Inventor: John H. Van Osch, 3415 Honey Creek Ct., Milwaukee, Wis. 53219

[22] Filed: Dec. 14, 1973

[21] Appl. No.: 424,679

Related U.S. Application Data

[62] Division of Ser. No. 238,696, March 27, 1972, , which is a division of Ser. No. 501,321, Oct. 22, 1965, Pat. No. 3,653,310.

[52] U.S. Cl. ............................................... 354/213
[51] Int. Cl. .......................................... G03b 19/04
[58] Field of Search .......... 354/212, 202, 213, 288, 354/214, 275, 215, 217, 218; 352/72

[56] References Cited
UNITED STATES PATENTS

| | | | |
|---|---|---|---|
| 2,132,157 | 10/1938 | Goldhammer | 354/212 |
| 2,350,693 | 6/1944 | Moomaw et al. | 354/212 X |
| 2,577,160 | 12/1951 | Simmon | 354/215 |
| 2,771,825 | 11/1956 | Naumann | 354/217 |
| 2,948,204 | 8/1960 | Kopp et al. | 354/275 |

Primary Examiner—John M. Horan

[57] ABSTRACT

A still camera is loaded with a film cartridge having a rotatable sprocket for pushing film out of and retracting it through a light trap opening in the cartridge and has a film metering mechanism which controls rotation of the sprocket and precisely regulates the amount of film pushed out of the cartridge and in front of the lens so that each individual picture has exactly the same predetermined position relative to the leading and trailing edges of the film on all film strips. The film metering means transports a length of film equal to a leader plus a single picture frame for the first picture and lengths equal to a single picture frame for succeeding pictures and precisely places the same identical portion on all film strips in front of the lens for corresponding picture frames.

11 Claims, 11 Drawing Figures

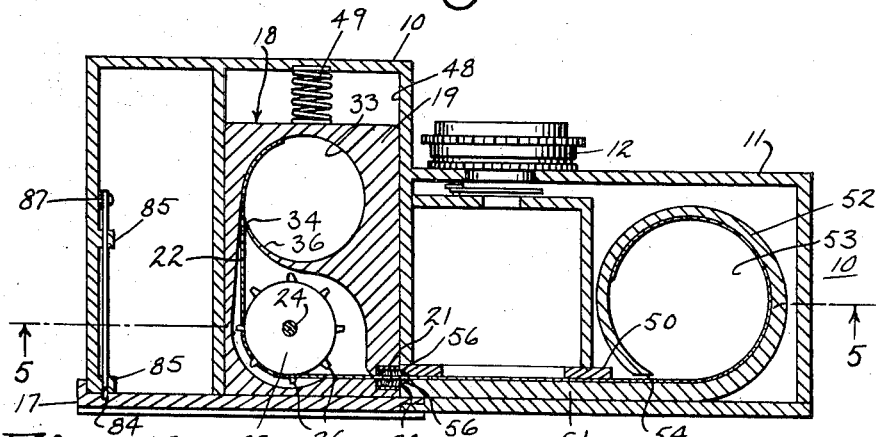

STILL CAMERA FILM METERING MECHANISM

This is a division, of application Ser. No. 238,696 filed Mar. 27, 1972, which was a division of application Ser. No. 501,321 filed Oct. 22, 1965, now U.S. Pat. No. 3,653,310.

This invention relates to photography and in particular to an improved photographic system for taking and processing still pictures.

The high cost of conventional photographic systems for taking and processing colored still pictures results at least in part from the wasted film leaders at the ends of the film and from the manual operations involved in printing from the developed film. Each frame of the developed film must be manually brought into register with the printing aperture in conventional photographic systems and individually printed, thereby making continuous and automatic printing impossible and substantially increasing the cost of print processing. Further, cameras of conventional photographic systems are difficult to load because the starting end of the roll must be manually affixed to the film advancing spool, the camera closed, and then several frames of film or paper leader advanced to bring unexposed film in front of the lens. The film leader attached to the film advancing spool is wasted and adds appreciably to the cost of the photographic system.

It is difficult to change from black and white to color film, or vice versa, in conventional cameras. For example, in 35 mm. photography it is necessary to rewind the film backwards into the cartridge before removal from the camera to permit change to another type of film. When it is desired to use the remaining film in the cartridge, it is necessary to cover the lens and advance the already exposed film one frame at a time past the lens and to trip the shutter at each frame to release the advancing mechanism. Further, it is impossible to tell when the last exposed frame is past the lens, and it is thus necessary to advance a few frames without exposing them to prevent possible double exposure. Paper-back spools of film cannot be reversed, and when it is desired to change to a different type of film in the middle of a roll, it is necessary to completely wind the film forward onto the take-up spool. It is then necessary to take the film into a darkroom and wind it in the reverse direction on another spool before it can be reloaded in the camera for exposure of the remaining picture areas. It is also necessary to cover the lens and advance the previously exposed film one exposure number at a time by tripping the shutter to release the advancing mechanism until unexposed film is in front of the lens.

It is an object of the invention to provide a still camera having improved film metering means which is less expensive and requires less film to produce a given number of pictures than prior art still cameras systems of photography. It is a further object of the invention to provide an improved system of photography which eliminates the necessity of manually registering each frame of the processed film with the printing aperture. Another object is to provide a system of photography including a still camera with film metering means which permits rapid change from one type of film to another in the camera without the loss of a single frame and in a much simpler manner than in conventional still cameras. Still another object of the invention is to provide an improved system of still picture photography including a camera with film metering, which eliminates the necessity of manually attaching the end of the film to a spool within the camera and which does not waste film at the ends of the film strip as in conventional photographic systems. A further object of the invention is to provide an improved still camera having film metering means system of photography wherein each individual picture has exactly the same predetermined position relative to the leading and trailing edges of the film on all film strips.

These and other objects and advantages of the invention will be more readily apparent from the following detailed description when taken in conjunction with the accompanying drawing wherein:

FIG. 4 is a horizontal sectional view taken through the camera along line 4—4 of FIG. 5;

FIG. 5 is a view taken along line 5—5 of FIG. 4;

FIG. 6 is a partial top view of the camera with a portion of the cover removed to illustrate the internal construction;

Figure 1:
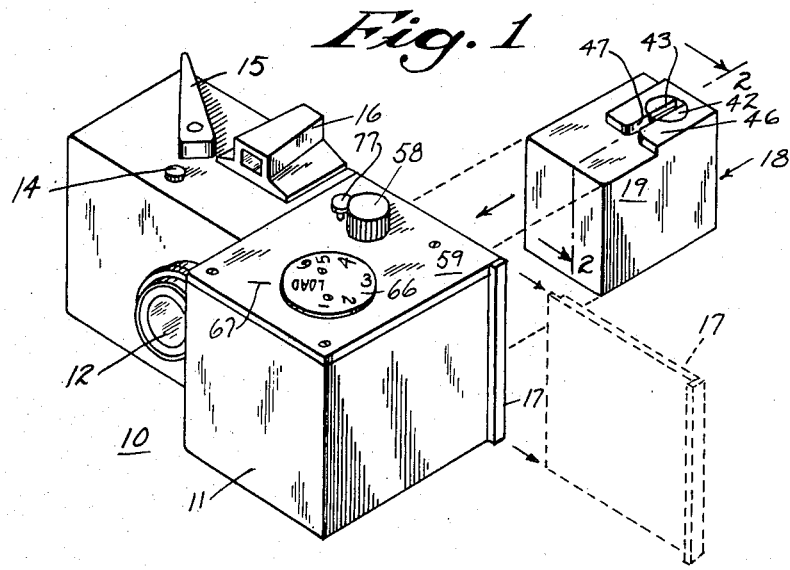
FIG. 1 is a perspective view of the camera and film cartridge of the photographic system of the invention.
Figure 2:
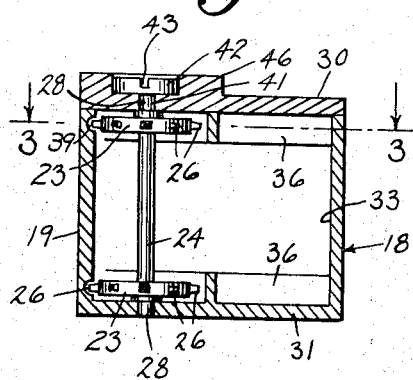
FIG. 2 is a view through the film cartridge taken along line 2—2 of FIG. 1.
Figure 3:
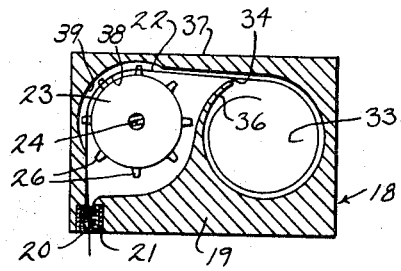
FIG. 3 is a view taken along line 3—3 of FIG. 2.
Figure 8:
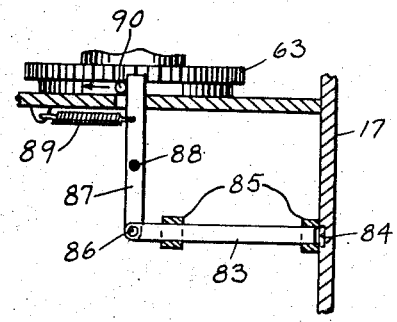
FIG. 8 is a view taken along line 8—8 of FIG. 5.
Figure 7:
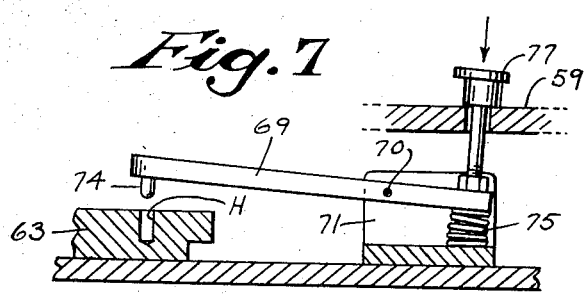
FIG. 7 is a view taken along line 7—7 of FIG. 6.

In accordance with the photographic system of the invention, each individual picture has exactly the same predetermined location relative to the leading and trailing edges of the film for all film strips. Consequently, the latent image for each exposure is at a predetermined identical position on all film strips. Film transporting means are provided which precisely places the same identical portion of all film strips in front of the lens for corresponding picture frames. Inasmuch as the area exposed, and thus the latent image for each picture, is at the identical predetermined position on all film strips, it is possible to automatically position negatives in precise register with an aperture in a film printer and to simultaneously print pictures from a plurality of negatives in a continuous system after the individual film strips are spliced together.

The camera and film cartridge of my improved system of photography will be described first and the development of the film and the printing of pictures will subsequently be disclosed. Referring to FIGS. 1-8 of the drawing, a still camera 10 for the system of photography of my invention includes a casing 11 which in conventional manner supports a lens 12, an exposure button 14, and a lever 15 for cocking the shutter, and an optical view finder 16. Camera casing 11 includes a door 17 which can slide to an open position to permit insertion of a film cartridge 18 into casing 11.

Cartridge 18 includes a hollow, box-shaped housing 19 having a light trap opening 20 therein covered by material 21 such as felt which prevents entrance of light into the interior of housing 19 while permitting insertion of photographic film strip 22 into housing 19. Film transporting means within cartridge housing 19 for positively engaging film strip 22 and for ejecting it from housing 19 and retracting it back into housing 19 may comprise a pair of sprocket wheels 23 affixed in axially spaced apart relation to a rotatably mounted shaft 24. Sprocket wheels 23 have teeth 26 thereon adapted to engage perforations, or notches 27 (See FIG. 5) spaced apart longitudinally of the film strip 22. The ends of shaft 24 may be journalled in openings 28 in the top and bottom walls 30 and 31 respectively of cartridge housing 19. The sprocket wheels 23 and shaft 24 are in the shape of a spool but do not constitute a spool in the conventional sense since film strip 22 is not wound thereon. A film storage compartment 33 having an entrance aperture 34 is formed in cartridge housing 19 by the cartridge end and side walls and by arcuate-in-cross-section, film guiding wall portions 36 at the top and bottom of housing 19 which cause the film 22 to assume the shape of a spiral coil within compartment 33. Sprocket wheels 23 are disposed between light trap opening 20 and film storage compartment 33, and the means for positively engaging film strip 22 and transporting it, including teeth 26 engaging perforations 27 in film strip 22 is adapted to push film strip 22 from compartment 33 out of light trap opening 20 and to pull it back through opening 20 and transfer it to compartment 33 upon rewinding. Arcuate wall portions 36 and a sidewall portion 37 of housing 19 together constitute film guiding means converging in a direction away from sprocket wheels 23 toward film compartment 33 which direct one end of film strip 22 into compartment 33. Housing 19 has an internal curvilinear surface 38 conforming closely to the periphery of sprocket wheels 23 and having a radius of curvature slightly smaller than the radius of teeth 26, and grooves 39 are provided in surface 38 receiving teeth 26 and permitting teeth 26 to protrude into perforations 27 as film strip 22 is inserted through light trap opening 20 and between sprocket wheels 23 and curvilinear surface 38.

An axial extension 41 on shaft 24 extends through top wall 30 of cartridge housing 19 and terminates in a head portion 42 having a non-circular film advancing portion 43 adapted to engage a complementary non-circular film advancing member 44 (See FIG. 5) of camera 10 to provide a releasable driving engagement therebetween. As illustrated in the drawing, the non-circular film advancing portion 43 of cartridge 18 is a diametrically extending slot in the configuration of a nick in the end of a screw and is adapted to engage a diametrically extending film advancing member 44 of the camera in the configuration of a screw driver tip. A portion 46 of top wall 30 of cartridge housing 19 surrounding shaft head portion 42 has a radially extending, cartridge orienting slot 47 therein adapted to receive member 44 of the camera and assures that cartridge 18 must have a predetermined orientation when it is inserted into camera casing 11.

Inasmuch as the cartridge 18 can only be inserted into the camera 10 in one position, the non-circular portion 43 and the sprocket wheels 23 must have a predetermined orientation relative to the cartridge housing 19 when cartridge 18 is inserted into camera casing 11, and consequently it will be appreciated that the leader end of the film strip 22 is always in a predetermined position relative to light trap opening 20 when cartridge 18 is inserted into camera casing 11.

Although the film transporting means within the cartridge 18 adapted to positively engage and move the film 22 is shown and described herein as including teeth 26 and perforations 27 in the film strip 22, it will be appreciated that other means may be utilized to accomplish this result such as friction drive wheels which engage the edges of the film strip or drive means utilizing magnetic material deposited on the film strip.

A compartment 48 in camera housing 11 is adapted to slidably receive cartridge 18 which can only be inserted into camera housing 11 when slots 43 and 47 are oriented to receive film advancing member 44 of the camera. A spring 49 within compartment 48 resiliently urges cartridge 18 against the closed camera door 17. No take-up spool for the film strip 22 is required in camera 10. Instead film transporting means push film strip 22 out of cartridge 18 so that a predetermined area of film strip 22 is in front of lens 12 for each exposure, and for each exposure this predetermined area is identical for all film strips used in the disclosed system of photography. Light trap opening 20 in cartridge 18 is opposite film guiding means within the camera casing 11 defined by back-to-back front and rear plates 50 and 51 having opposed beveled edges 56 defining a generally V-shaped opening between plates 50 and 51 to facilitate entry of film strip 22 therebetween when film 22 is pushed out of cartridge 18. Front plate 50 is the aperture plate. In most cameras the back plate is spring mounted and presses the film against the aperture plate to maintain the desired focal distance. However, in the present camera front and back plates 50 and 51 touch at their upper and lower edges and one plate is undercut to a depth slightly greater than the thickness of the film strip 22 to permit passage of the film strip and precise positioning of the film strip at the focal plane. Rear plate 51 has a curvate end portion 52 which forms a generally cylindrical film chamber 53 within camera housing 11. The end of curvate portion 52 is spaced slightly from the flat portion of rear plate 51 to define a vertically elongated entrance aperture 54 into film chamber 53. Front plate 50 has a framing aperture 55 therein.

The details of the lens as well as the conventional double exposure preventing means of the camera have been omitted from the drawing to simplify the construction and to facilitate the understanding of the invention.

The film transporting means for ejecting film 22 out of cartridge 18 and into a position in front of lens 12 includes a knurled film advancing knob 58 on the top wall 59 of casing 11 affixed to a shaft 60 extending through top wall 59 and having a small toothed gear 61 and the film advancing member 44 secured to the lower end thereof. Gear 61 engages a relatively large indexing gear 63 rotatably mounted on a shaft 64 within camera casing 11. Shaft 64 extends through top wall 59 of casing 11 and is affixed to an index plate 66 exterior of casing 11 having the indicia LOAD and the exposure numbers, for example, 1 through 6, thereon. An index marker 67 cooperating with index plate 66 is provided on top wall 59 of camera casing 11.

A plurality of circumferentially spaced apart, vertically extending, indexing holes H1, H2, H3, H4, H5, H6, and HL provided in the top face of indexing gear 63 index when the predetermined portion of film strip 22 for each exposure is opposite framing aperture 55 and lens 12. Film strip 22 can be of such length to provide a number of exposures greater than six and camera 10 can also be modified to take a greater number of exposures, but in order to shorten the description and to facilitate the understanding of the invention, it will be assumed throughout the remainder of the description that film strip 22 is of sufficient length to permit six exposures and camera 10 is also constructed to take six pictures for each film cartridge 18.

A rocker arm 69 within camera casing 11 pivotally mounted by a pin 70 (Seen best in FIG. 7) on a U-shaped support 71 has a depending latch pin 74 at one end resiliently urged against the upper surface of indexing gear 63 by a spring 75 engaging the other end of rocker arm 69. Latch pin 74 falls into the indexing holes HL, H1, H2, H3, H4, H5, and H6 sequentially as indexing gear 63 is rotated by film winding knob 58 and gear 61, and latch pin 74 locks indexing gear 63 in a position wherein the desired predetermined portion of the film strip 22 for each of the exposures one to six is in front of lens 12. Winding knob 58 can only be rotated to advance film strip 22 to the next exposure by depressing button 77 on the upper surface of camera casing 11 which pivots rocker arm 69 about pin 70 against the force of spring 75 and lifts latch pin 74 from the indexing hole in which it was engaged.

After cartridge 18 is inserted into camera casing 11 and door 17 closed, winding knob 58 is manually rotated to eject film strip 22 from cartridge 18 and advance it in front of lens 12. Winding knob 58 can only be turned after button 77 is depressed to lift latch pin 74 out of the indexing hole HL corresponding to the LOAD position. Counterclockwise rotation of winding knob 58 actuates cartridge shaft 24 through mating non-circular film advancing portions 44 and 43 of camera 10 and cartridge 18 respectively. Rotation of shaft 24 and sprocket wheels 23 having teeth 26 engaging perforations 27 in the film strip 22 pushes film strip 22 out of light trap 20 in the cartridge 18 and advances the end of film strip 22 between the front and rear plates 50 and 51. The end of the film strip 22 is guided by the beveled edges 56 of plates 50 and 51 which define a generally V-shaped opening between the plates. The film strip 22 is advanced by teeth 26 engaging notches 27 until latch pin 74 on rocker arm 69 falls into the indexing hole H1 in indexing gear 63 and thus prevents further rotation of winding knob 58. Indexing hole H1 corresponds to exposure number one on film strip 22, and when latch pin 74 drops into indexing hole H1 and indicia "1" on index plate 66 is opposite marker 67, a predetermined length of film 22, for example, a length of film equal to the distance between twelve notches 27, constituting a leader of six notch length plus a picture frame of six notch length, has been pushed out of cartridge 18. The last six notch length constituting the first picture frame, or exposure number one, has been moved in front of framing aperture 55 and lens 12. It will be appreciated that non-uniform spacing of indexing holes H makes it possible to move a greater length of film out of cartridge 18 between the LOAD position and the first exposure than is pushed out of the cartridge 18 between successive exposures. In the above example, a length of film 22 equal to the distance between 12 notches is moved to bring the first frame in front of the lens 12, whereas to advance film 22 to the second exposure it is only necessary to depress button 77 and rotate winding knob 58 until a length of film 22 equal to the distance between six sprocket holes 27 is advanced and latch pin 74 falls into indexing hole H2 corresponding to the second exposure. The exposed portion of film strip 22 is pushed into film chamber 53 in camera casing 11.

In order to assure that the leading edge of film strip 22 is not fogged, the first frame, or picture area begins six notches 27 from the leading edge of the film and ends at the twelfth notch 27. In other words, the predetermined portion of the film for the first exposure area constituting picture number one will be between the sixth and twelfth perforations and six perforations will have been advanced past framing aperture 55 in the camera. It will be appreciated that this same predetermined portion for picture number one of all film strips utilized in my system of photography will be in front of the camera lens, that it is unnecessary to manually affix the leading edge of the film strip 22 to a spool within the camera, and that minimum length of film leader is wasted. In conventional photographic systems the wasted part of the film is that portion of the film in front of the lens and the portion wound on the film advancing spool before the camera is closed.

After taking the first picture, film strip 22 is transported to the second exposure by depressing button 77 and turning knob 58 until a film length equal to the distance between six perforations has been advanced in front of lens 12 and latch pin 74 falls into the succeeding indexing hole H2.

Figure 9:
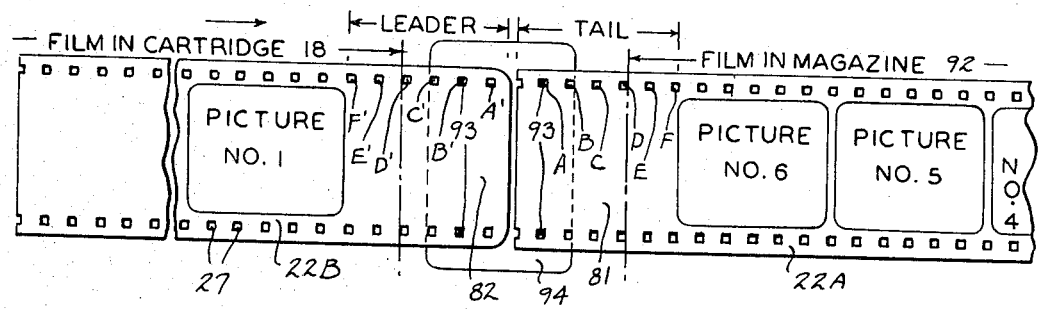
FIGS. 9 and 10 are views illustrating the film splicing step of the photographic system of the invention, FIG. 9 being an enlarged plan view showing the film being held in registration for splicing as illustrated in FIG. 10.

When film strip 22 has been transported to the last exposure and latch pin 74 falls into indexing hole H6, a stop block 79 on camera casing 11 interferes with a stop member 80 affixed to indexing gear 63 as shown in dotted lines in FIG. 6 and prevents further rotation of winding knob 58 in the forward direction. Thus film strip 22 is stopped from further movement in the forward direction after the last exposure. This construction permits a minimum length of film to remain in cartridge 18, and the unexposed length of film, or tail, 81 remaining within cartridge 18 constitute only the length between the edge of framing aperture 55 and two perforations 27 in engagement with two teeth 26 on cartridge sprocket wheels 23. As shown in FIG. 9, the tail 81 is the length between six perforations 27 and is identical in length to the leader 82.

In order to rewind film strip 22 into cartridge 18, button 77 is held depressed and knob 58 is rotated in a clockwise direction until the indicia LOAD on indexing plate 63 is opposite marker 67, at which point stop 80 affixed to indexing gear 63 is against the opposite side of stop block 79 as shown in full lines in FIG. 6 and further rotation of film 22 in the reverse direction is prevented. At this position the film strip 22 is fully retracted into the cartridge 18 and occupies exactly the same position as when cartridge 18 was originally inserted into camera casing 11. Camera door 17 is now opened and cartridge 18 removed from camera casing 11.

Camera door 17 cannot be opened to insert or remove cartridge 18 unless the indicia LOAD on index plate 66 is opposite index marker 67. If any other indicia on index plate 66 is opposite marker 67, the door 17 is locked closed. This feature prevents improper loading of the cartridge 18 into the camera 10. Door 17 is provided with a locking notch 84. A locking member 83 is slidable lengthwise in bearing blocks 85 and is pivotally connected by a pin 86 to a lever 87 which is pivoted about a pin 88. Lever 87 is normally resiliently urged by a spring 89 to actuate locking member 83 into notch 84 when the door 17 is closed, thus preventing opening of the camera and accidental exposure of film 22 to light except when film 22 is fully retracted into cartridge 18, at which time the indicia LOAD is opposite marker 67. When the film advancing knob 58 is turned to actuate the indicia LOAD opposite marker 67, a radially extending pin 90 secured to indexing gear 63 strikes one end of pivoted lever 87 and disengages locking member 83 from the notch 84, thereby permitting the door 17 to be opened.

The disclosed cartridge and camera of my system of photography permits easy and quick change to a different type of film. Assume three black and white pictures of photographic film 22 have been exposed, and it is desired to change to color film, exposure number three has been made and indicia "3" on index plate 66 is opposite marker 67. It is only necessary to depress button 77 and turn knob 58 clockwise until indicia LOAD is opposite marker 67 and latch pin 74 falls into indexing hole HL, at which time the film strip 22 has been retracted into cartridge 18 in exactly the same predetermined position it occupied when cartridge 18 was originally inserted into camera casing 11. Door 17 can be opened, cartridge 18 removed, and a cartridge containing color film inserted into camera 10 and exposed as desired. If it is now desired to re-load cartridge 18 containing the original black and white film strip having three exposed frames, it is merely necessary to insert cartridge 18 into casing 11, close door 17, depress button 77 and turn winding knob 58 until indicia "4" on index plate comes opposite marker 67 and latch pin 74 falls into indexing hole H4. Exposure number 4 on black and white film 22 can now be made. It is unnecessary to stop at each frame number, cover the lens, and operate the exposure lever in order to advance the film past each frame as in conventional cameras. It is unnecessary to re-spool the entire roll of film in a darkroom as is required with conventional cameras using roll film. I have found that it is possible to change from a partially exposed film to a different kind of film and be ready to take a picture with the new kind of film in less than fifteen seconds with the camera and cartridge of my system of photography.

Figure 10:
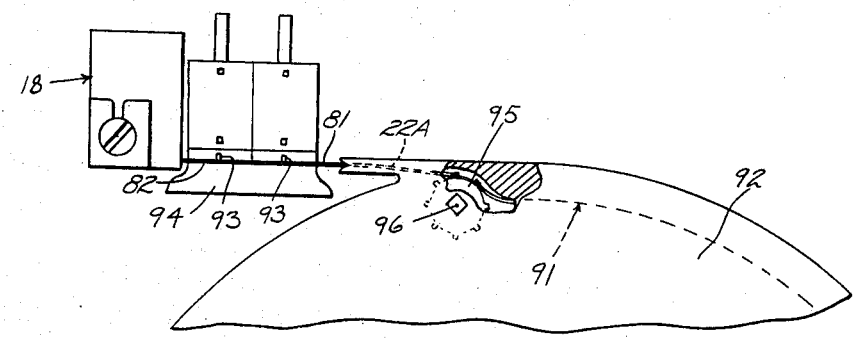

The latent image for each exposure is in a predetermined position for all film strips 22, and in the preferred system of my invention a plurality of film strips 22A, 22B, 22C, etc. are spliced end-to-end so that the negatives developed from such latent images can be automatically brought into registration with a printing aperture in a continuous developing and printing process. FIGS. 9 and 10 illustrate the step of placing a plurality of film strips 22A, 22B, 22C, etc. end-to-end to provide a continuous length of film 91 which can be advanced continuously through developing and printing apparatus so that film transporting means engaging perforations 27 can automatically index the negatives into register with a printing aperture and a plurality of pictures printed simultaneously.

Assume that a continuous length of film 91 comprising a plurality of film strips spliced end-to-end in a manner hereinafter described has been inserted into a film magazine 92 so that a portion of the trailing edge, or tail 81 of one film strip 22A extends through the light trap in magazine 92. FIG. 9 is an enlarged plan view of the splicing operation illustrated in FIG. 10 wherein the tail 81 of film strip 22A extending from the light trap in magazine 92 is being spliced to the leader 82 of film strip 22B within cartridge 18. In my system of photography, the splicing of a plurality of film strips such as 22A and 22B end-to-end can be accomplished in a lighted room without fogging the exposed film. As shown in FIG. 9, only four of the six perforations comprising tail 81 extend beyond the light trap in magazine 92 and are exposed to light. One perforation A on each edge of tail 81 engages a pin 93 on splicing block 94. FIG. 9 illustrates that perforations A, B, C, and D extend beyond the light trap in magazine 92 and that perforations E and F are in the light trap, thereby providing protection against light striking the area of picture number six. As further shown in FIG. 9, four perforations A', B', C', and D of the six perforations comprising the leader 82 of film strip 22B extend beyond the light trap of cartridge 18. Perforations E' and F' of leader 82 are within the light trap to protect against light striking the area of picture number one of film strip 22B.

The tail 81 of film strip 22A is spliced to leader 82 of film 22B so that the normal perforation distance is maintained and also a distance is maintained between picture six on film strip 22A and picture one on film stip 22B which is a multiple of the length of one picture. In other words, the distance between picture six on film strip 22A and picture one on film strip 22B is equal to 12 perforations, which is exactly twice the length of a single picture area. Tail 81 of film 22A and leader 82 of film 22B are placed over pins 93 of splicing block 94, a separate piece of perforated film (not shown) is placed over the pins 93 so that it overlaps tail 81 and leader 82, and the three pieces of film are welded together by heating elements (not shown) in the upper and lower jaws of film splicing block 94. Non-circular film advancing portion 43 on cartridge 18 permits automatic feeding of film 22B to splicing block 94 so that the leader 82 of film 22B occupies a predetermined position relative to splicing block 94. Magazine 92 has an internally mounted sprocket 95 provided with a shaft extending through a wall of magazine 92 and having a non-circular driving end 96. Sprocket 95 is adapted to engage perforations 27 on film 91 and is positioned adjacent the light trap in magazine 92. Sprocket 95 and non-circular driving end 96 provides means for pulling film 22B from cartridge 18 and into magazine 92 and stopping film 22B with precisely four perforations of the tail extending from the light trap in magazine 92.

It will be appreciated that continuous length of film 91 within magazine 92 is an end-to-end series of six latent images separated by a predetermined number of sprocket holes which is a multiple of the number of sprocket holes covered by the length of each latent image, thereby permitting automatic sequencing in the printing machine.

Figure 11:
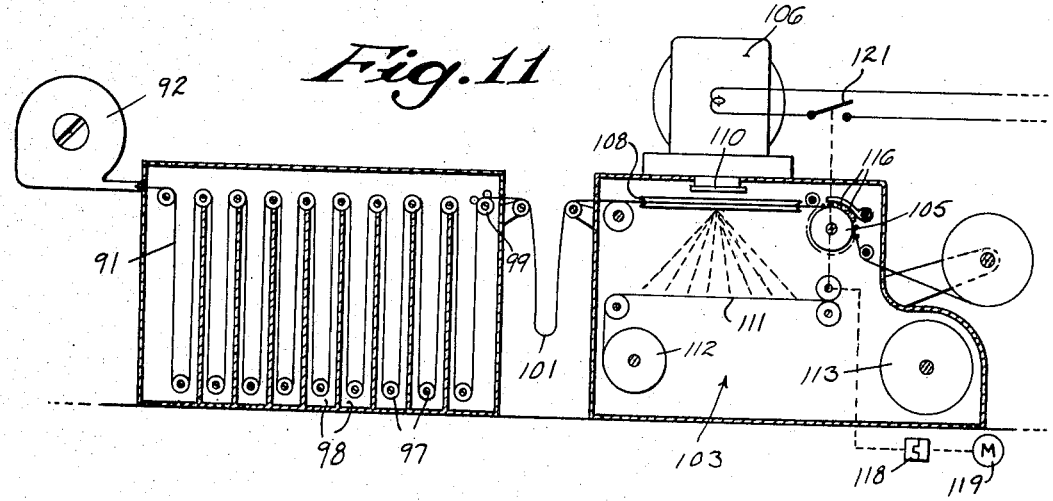
FIG. 11 is a view illustrating the developing and printing steps of the photographic system of the invention.

As illustrated in FIG. 11, film 91 from magazine 92 is pulled over a series of rollers 97 through a series of tanks 98 for the various processing steps by rollers 99 driven continuously from a suitable power source (not shown). A slack loop 101 of the developed film 91 is provided between the film processor 98 and photographic printer 103 to accomodate intermittent movement of film printer 103. Developed film 91, comprising end-to-end film strips 22A, 22B, 22C, etc., is intermittently advanced by a sprocket wheel 105 of printer 103 past a light source 106 and so that all six exposures one to six of each film strip 22A, 22B, 22C, etc., are brought into register with a printing aperture 108 simultaneously. Light passing through the six exposures may be focused by a lens 110 upon printing paper 111 fed from a supply reel 112 and wound on a take-up reel 113. Sprocket wheel 105 has teeth 116 engaging perforations 27 in film 91 and intermittently advances each successive series of six exposures of one of the end-to-end strips 22A, 22B, 22C, etc., into register with printing aperture 108. Sprocket wheel 105 may have the same number of teeth 116 as there are sprocket holes 27 in six exposures and the length of film between each set of six negatives, i.e., six times six plus 12 equals 48 teeth 116, so that one revolution of sprocket wheel 105 automatically pulls the succeeding set of six exposures of a film strip such as 22B into register with printing aperture 108. A single revolution of sprocket wheel 105 can be accomplished by any suitable intermittent drive means such as a Geneva gear (not shown) or an electric clutch 118 driven from a continuous source of power 119. Printing paper 111 may be intermittently advanced so that printing paper 111 is stationary during exposure thereof and subsequently a sufficient length of printing paper is advanced, simultaneously with movement of film 91, to permit simultaneous printing of six pictures. Drive wheel 105 may be interlocked with a switch 121 for controlling light source 106 so that light source 106 is turned off during movement of film 91 and printing paper 111 and is only turned on after film 91 is stationary and the six negatives are in register with printing aperture 108.

Although the same light source 106 of the processing apparatus as disclosed simultaneously covers six negatives, it will be appreciated that the invention is not so limited and also comprehends automatically transporting a plurality of exposures into registry with the same number of printing apertures and simultaneously printing all six exposures in accordance with their individual density reading and color correction requirements through a separate light source for each printing aperture which can be of the type utilizing fiber optic means to transmit controlled light to the plurality of printing apertures.

It will also be appreciated that the disclosed system of photography eliminates the costly step of manually bringing each negative into registry with the printing aperture and permits developing and printing to be accomplished in a continuous automatic operation.

While only a single embodiment of the camera, cartridge, and processing steps of the photographic system of the invention have been illustrated and described, many modifications and variations thereof will be readily apparent to those skilled in the art, and consequently it is intended in the appended claims to cover all such variations and modifications which fall within the true spirit and scope of the invention.

I claim:

1. In combination with a still camera having a housing provided with a compartment adapted to receive a film cartridge containing a rotatable film sprocket having teeth adapted to engage perforations in a photographic film and a noncircular portion exterior of the cartridge to push the film out of a light trap opening in said cartridge and in front of the camera lens, film metering means comprising a film-actuating member rotatably mounted within said camera housing and having a noncircular portion complementary to and adapted to releasably engage said noncircular portion of said sprocket, an indexing member operatively connected to said film actuating member and being rotatably mounted within said camera housing and carrying a plurality of arcuately spaced apart stop means corresponding to the number of picture frames to be exposed on the film, latch means within said housing in the path of movement of said stop means as said indexing member rotates for latching each of said stop means as it passes to thereby control the length of film pushed out of said cartridge, manually operable means on said camera housing for releasing said latch means, a manually rotatable film winding member on said camera housing operatively connected to said indexing member and to said film-actuating member, the spacing between the first and second of said stop means being different than that between other adjacent stop means to permit pushing a length of film equal to a leader plus one picture frame out of said light trap opening in the initial movement of said film, said indexing member having a cartridge-loading position wherein said latch means latches the first of said stop means on said indexing member and said cartridge can be inserted into and withdrawn from said compartment, and including means on said camera housing for preventing insertion of said cartridge into said compartment when said indexing member is away from said cartridge-loading position.

2. The combination of claim 1 wherein said means for preventing insertion of said cartridge comprises said film-actuating member being oriented in a position wherein its noncircular portion cannot engage said noncircular portion of said sprocket and blocks entry of said cartridge into said compartment.

3. The combination of claim 1 wherein said camera housing has a movable door permitting insertion of said cartridge into and withdrawal thereof from said compartment and including means in said camera housing responsive to said indexing member being away from said cartridge-loading position for locking said door and being responsive to said indexing member being latched in said cartridge-loading position for unlocking said door.

4. The combination of claim 1 wherein said indexing member has a plurality of arcuately spaced apart indentations each of which comprises one of said stop means, said latch means includes a latch member pivotally mounted within said camera housing and carrying a latch pin adapted to enter said indentations, and including resilient means for biasing said latch member in a direction to insert said latch pin into said indentations.

5. The combination of claim 1 wherein said indexing member has teeth and including a gear rotatably mounted within said housing and having teeth meshing with the teeth on said indexing member, and a shaft rotatably mounted within said housing and being affixed to said handle and to said gear and to said film actuating member.

6. The combination of claim 5 wherein said indexing member is a toothed gear having a plurality of arcuately spaced apart indentations each of which comprises one of said stop means, and said latch means includes a latch member pivotably mounted within said camera housing and carrying a latch pin adapted to enter said indentations, and including resilient means for biasing said latch member in a direction to insert said latch pin into said indentations.

7. The combination of claim 6 including cooperable stop means on said indexing member and on said camera housing for preventing additional rotation of said indexing member after the last picture frame on the film has been pushed in front of the camera lens.

8. The combination of claim 7 wherein said indexing member has a cartridge-loading position wherein said latch pin is within the first of said indentations and said noncircular portion of said film actuating member is oriented to permit entry of said cartridge into said camera housing and releasably engages said noncircular portion of said sprocket, and wherein said noncircular portion of said film actuating member is oriented to obstruct entry of said cartridge into said camera housing and prevent engagement with said noncircular portion of said sprocket when said indexing member is away from said cartridge-loading position.

9. The combination of claim 8 wherein said camera housing has a movable door for insertion of said cartridge into said compartment and including means in said camera housing for locking said door when said indexing member is away from said cartridge-loading position and for unlocking said door when said indexing member is in said cartridge-loading position.

10. The combination of claim 1 and including cooperating stop means on said indexing member and on said camera housing for preventing additional rotation of said indexing member after the portion of the unexposed film corresponding to the last picture frame has been pushed in front of the camera lens.

11. The combination of claim 1 and including a stationary pointer on the exterior of said camera housing, and a plate carrying picture frame indicia rotatably mounted on the exterior of said camera housing adjacent said stationary pointer and being operatively connected to said indexing member.

* * * * *